(12) United States Patent
Chavagnac et al.

(10) Patent No.: US 8,702,041 B2
(45) Date of Patent: Apr. 22, 2014

(54) AERODYNAMIC AND SPATIAL COMPOSITE FLIGHT AIRCRAFT, AND RELATED PILOTING METHOD

(75) Inventors: Christophe Chavagnac, Paris (FR); Jérôme Bertrand, Saint Aubin de Medoc (FR); Hugues Laporte-Weywada, Les Loges en Josas (FR); Olivier Poulain, Aix en Provence (FR); Philippe Matharan, Germs sur L'Oussouet (FR); Robert Laine, Paris (FR)

(73) Assignee: Astrium, S.A.S, Paris (FR)

( * ) Notice: Subject to any disclaimer, the term of this patent is extended or adjusted under 35 U.S.C. 154(b) by 757 days.

(21) Appl. No.: 12/443,359

(22) PCT Filed: Oct. 17, 2007

(86) PCT No.: PCT/EP2007/061113
§ 371 (c)(1),
(2), (4) Date: Jul. 26, 2010

(87) PCT Pub. No.: WO2008/046872
PCT Pub. Date: Apr. 24, 2008

(65) Prior Publication Data
US 2010/0276545 A1    Nov. 4, 2010

(30) Foreign Application Priority Data
Oct. 20, 2006 (FR) ..................... 06 54420

(51) Int. Cl.
*B64G 1/14* (2006.01)
*B64G 1/26* (2006.01)
*B64G 1/40* (2006.01)
*B64D 27/02* (2006.01)
*B64C 39/12* (2006.01)

(52) U.S. Cl.
USPC .......... 244/158.9; 244/171.4; 244/15; 244/55

(58) Field of Classification Search
USPC ...... 244/2, 13, 15, 53 R, 55, 58, 63, 73 R, 74, 244/158.1, 158.9, 159.1, 159.3, 171.1, 244/171.3, 171.4
See application file for complete search history.

(56) References Cited

U.S. PATENT DOCUMENTS 2,981,499 A * 4/1961 Janney, II .......................... 244/2
3,104,079 A     9/1963 Phillips
(Continued)

FOREIGN PATENT DOCUMENTS

EP      0 264 030 A2    4/1988
FR      1 409 520       8/1965
(Continued)

OTHER PUBLICATIONS

"Lockheed P-2 Neptune" Wikipedia, the Free Encyclopedia, taken Sep. 28, 2012 at http://en.wikipedia.org/wiki/Lockheed_P-2_Neptune.*

(Continued)

*Primary Examiner* — Joseph W Sanderson
(74) *Attorney, Agent, or Firm* — Miles & Stockbridge P.C.

(57) ABSTRACT

An aircraft having propulsion units for both conventional aircraft flight in the atmosphere and for high-altitude operation as a rocket. The aircraft is divided into a payload compartment and a compartment containing rocket propulsion unit propellant or fuel, and includes a long transverse wing with a small back-sweep to favor lift in the dense layers of the atmosphere and to thus make it possible to climb to high altitudes at a subsonic speed before using the rocket propulsion units. The return flight portion is performed by gliding or controlled as for a conventional aircraft.

9 Claims, 2 Drawing Sheets

(56) References Cited

U.S. PATENT DOCUMENTS

| | | | |
|---|---|---|---|
| 3,602,460 A * | 8/1971 | Whittley et al. | 244/12.4 |
| 3,698,659 A * | 10/1972 | Blackstock | 244/2 |
| 3,702,688 A * | 11/1972 | Faget | 244/159.3 |
| 4,802,639 A * | 2/1989 | Hardy et al. | 244/2 |
| 5,295,642 A * | 3/1994 | Palmer | 244/2 |
| 5,456,424 A * | 10/1995 | Palmer | 244/2 |
| 5,529,263 A * | 6/1996 | Rudolph | 244/55 |
| 5,564,648 A * | 10/1996 | Palmer | 244/2 |
| 5,984,228 A * | 11/1999 | Pham | 244/2 |
| 6,119,985 A | 9/2000 | Clapp et al. | |
| 6,193,187 B1 | 2/2001 | Scott et al. | |
| 6,398,166 B1 * | 6/2002 | Ballard et al. | 244/158.1 |
| 6,557,803 B2 * | 5/2003 | Carpenter et al. | 244/159.3 |
| 6,612,522 B1 * | 9/2003 | Aldrin et al. | 244/2 |
| 6,616,092 B1 * | 9/2003 | Barnes et al. | 244/2 |
| 6,745,979 B1 | 6/2004 | Chen | |
| 7,753,315 B2 * | 7/2010 | Troy | 244/171.3 |
| 8,168,929 B2 * | 5/2012 | Ustinov | 244/3.25 |
| 2003/0042367 A1 * | 3/2003 | Carpenter et al. | 244/162 |
| 2003/0183727 A1 * | 10/2003 | Carpenter et al. | 244/162 |
| 2005/0230517 A1 * | 10/2005 | Troy | 244/2 |
| 2005/0279889 A1 | 12/2005 | Greene | |

FOREIGN PATENT DOCUMENTS

| | | |
|---|---|---|
| FR | 1 409 570 A | 8/1965 |
| GB | 2 176 451 A | 12/1986 |
| GB | 2 362 145 A | 11/2001 |
| WO | WO 98/30 449 | 7/1998 |
| WO | WO 98 39207 A | 9/1998 |
| WO | WO 01 64513 A1 | 9/2001 |

OTHER PUBLICATIONS

R. Varvill and A. Bond, "The SKYLON Spaceplane", Journal of the British Interplanetary Society, vol. 57, 2004, pp. 22-32, XP-002434025.

World Wide Web site "http://spacefuture.com/vehicles/designs.shtml," pp. 1-60, retrieved on Aug. 28, 2009.

* cited by examiner

AERODYNAMIC AND SPATIAL COMPOSITE FLIGHT AIRCRAFT, AND RELATED PILOTING METHOD

BACKGROUND OF THE INVENTION

The subject of this invention is an aerodynamic and spatial mixed flight aircraft, and the related piloting method thereof.

The field of the invention is that of spaceplanes, i.e. vehicles capable of taking off from the ground like aircraft, reaching space and returning by landing on Earth, also like aircraft. These vehicles must be able to carry a payload and offer suitable safety conditions for manned flights, like conventional aircraft, and they must in particular be reusable, unlike rockets, which are consumed during the launch at the end of the flight. The term space may be understood according to International Aeronautical Federation terminology, which refers to the entire designated volume outside the Earth's atmosphere, above one hundred kilometers in altitude by convention. It may also be considered as the volume where the atmosphere is too rarefied to enable the flight of conventional aircraft.

A distinction may be made between orbital aircraft, which are capable of reaching the orbital speed at a given altitude (of the order of 7.5 km/s at 200 km in altitude), and suborbital aircraft, which are unable to do so. Orbital aircraft are capable of becoming satellites remaining for an almost indefinite time in orbit after the propulsion phase, whereas suborbital aircraft follow a trajectory which returns them to Earth when the propulsion phase thereof is complete, after a finite time, of the order of an hour and a half, or less. Orbital aircraft are distinguished from suborbital aircraft particularly by the quantity of energy to be carried to reach the orbital speed and by the specific design received to withstand the considerably greater overheating experienced on re-entering the atmosphere. The present invention firstly relates to suborbital aircraft, but not exclusively since it would be conceivable to apply it to orbital aircraft with quantitative or secondary modifications, and it may also transport a vehicle capable of orbital flight as its payload.

Unlike rockets which have already been the subject of significant industrial developments, spaceplanes are still very infrequent, and many only exist in the project phase. A first example is the American shuttle which is not, however, a spaceplane per se but a two-stage composite launcher, taking off like a rocket and wherein only the second stage, which is released after the takeoff phase, is a space glider. This space glider has the dual advantage, sought with the invention, of being able to be reused and land on Earth in the same way as a supersonic glider, therefore at a high speed and without being able to correct an error; however, the first stage retains the drawbacks of the rocket, primarily the single use and the high consumption of propellant or fuel to pull away from the near atmosphere.

A second example of a spaceplane was devised by Scaled Composite; it also has two stages. A first aerodynamic flight aircraft pulls another to around 15 km in altitude and releases it. The second aircraft has an anaerobic rocket engine, capable of carrying the payload to 100 km in altitude. Said second stage lands similarly to that of the shuttle.

A third, substantially older, example, is the American X15 prototype, which was released from a carrier aircraft and could reach an altitude greater than 100 km.

Other space vehicles are described in the website http://www.spacefuture.com/vehicles/designs.shtml, but these vehicles have not been built or commissioned. Some take off vertically, but their propulsion mode remains as costly as that of a rocket, or they are associated with a rocket serving as a first stage thereof, such as the American space shuttle.

The documents EP 0 264 030, GB 2 362 145, WO 98/30 449, WO01/64513, U.S. Pat. No. 6,119,985, U.S. Pat. No. 6,745,979, US 2005/0279889, U.S. Pat. No. 6,193,187 and FR 1 409 570 respectively illustrate a two-stage launcher; a launcher wherein a balloon is the first stage; an aircraft pulling another; a launcher wherein the first stage is a composite propulsion launcher for aeronautical engines and rocket engines; a spacecraft fuelled with oxygen; three variable geometry aircraft; and a conventional aircraft (with a propeller in the embodiment shown) whereto orientation modification nozzles have been adjoined, which are auxiliary engines not involved in propulsion.

Therefore, the majority of aircraft projects in space, and the only ones to have flown have multiple stages. This design appears to be more advantageous in that it allows a more beneficial ratio between the effective mass and the mass at takeoff, which offers the possibility of associating a greater quantity of fuel with the payload and therefore propel same further. The drawbacks are that the complexity is increased considerably and that the upper stage has reduced scope for movement. The two stages must all be equipped with the same means for some functions, such as the directional nozzles to adjust the orientation thereof and they must also comprise separation means. The upper stage is not piloted effectively for the return and must re-enter in glide mode. This and the circumstance that the release means may be subject to failures renders the flight more risky.

Some aircraft used composite aerobic and anaerobic propulsion, to circulate successively in the dense atmosphere and in space. This idea is used in the invention, more effectively however as prior designs do not generally make it possible to do away with the constraint of multiple stages. The main reason lies in a different choice of wings, as it appeared to the present inventors that the wings generally proposed for said prior designs were short, delta-shaped wings with a large back-sweep, well-suited to supersonic flights but wherein the lift is less satisfactory. On the other hand, the design according to the invention uses a long, straight wing, with a small back-sweep, to provide a satisfactory lift in the dense atmosphere and up to a high altitude. These portions of the voyage are completed without problems at subsonic speed. The rocket propulsion only starts at a relatively high atmosphere so that the aerodynamic forces remain manageable for the wing. In this case, it is not necessary to adopt a variable geometry to protect the wing and reduce the drag by folding it back against the fuselage.

On the contrary, a rigid, simpler, lighter design is preferred, requiring less maintenance and not subject to damage.

SUMMARY OF THE INVENTION

As a general rule, it was sought to optimise the atmospheric flight in terms of consumption, altitude and mass; this led to the adoption of the high-altitude subsonic flight concept, and made it possible to optimise the total mass, and the rocket propulsion in particular, as less mass for the atmospheric flight implies less rocket propulsion and less fuel for the atmospheric flight, and again less mass and less fuel for the atmospheric flight: it was possible to achieve a relatively simple, light and energy-efficient aircraft to carry its own fuel, without a separate auxiliary launcher or in-flight refueling, and capable of starting and ending the flight like a conventional aircraft, with piloting and horizontal orientation. It is necessary to underline the advantage of being able to pilot and direct the aircraft during the return flight, compared to gliding returns, to improve the safety of manned flights. In this way, the aircraft will be able to cover significant distances after the return thereof into the atmosphere and choose the landing strip. The end of flight speed will be much slower than with a delta wing vehicle devised for supersonic flight.

An aim of the invention is to do away with the drawbacks of the prior designs and supply a new kind of spacecraft, with a single stage capable of flying correctly, with full piloting capacities, at low altitude while being able to continue the voyage thereof in space. This aircraft will have the general outer appearance of a commercial aircraft and will differ from a conventional aircraft by certain arrangements.

In a general embodiment, the aircraft according to the invention comprises a fuselage, an essentially straight and elongated fixed transverse wing, having a greater span than the length of the fuselage, aeronautical engines positioned on the fuselage or in the fuselage, and propellant or fuel propulsion units. This composition guarantees satisfactory piloting possibilities at both low altitude and high altitude.

Preferentially, the wing span and the length of the fuselage are in a ratio between 1 and 2; more preferentially, between 1 and 1.4. The surface loading (ratio between the wing surface and the total mass of the aircraft, which determines the altitude reached in subsonic flight) is preferentially between 2.5 and 3.3 $m^2$ per tonne. The unladen mass is preferentially between 40% and 60% of the laden mass.

According to an important possibility, the propellant or fuel tanks are positioned in a rear portion of the fuselage, the wing is positioned on said rear portion, a front portion of the fuselage comprises a cabin for the pilot and the passengers and the aircraft comprises a forward tail group placed on said front portion. The aircraft is in this case devised for the transport of passengers, the high loads at takeoff being at the rear and the wing also being moved to the rear with respect to conventional aircraft designs in order to account for the very rearward position of the centre of gravity. The forward tail group at the front restores the stability and thus assists with the lift.

The invention also relates to an aircraft piloting method comprising a first aerodynamic flight step using aeronautical engines, a second space launch flight step using rocket propulsion units after controlling an aircraft inclination change between the first step and the second step, a third gliding descent step with the fuselage substantially perpendicular to the trajectory, and a fourth aerodynamic flight landing step after repositioning the aircraft substantially in the direction of the trajectory between the third flight step and the fourth flight step.

The rocket propulsion is preferentially with variable thrust.

BRIEF DESCRIPTION OF THE DRAWINGS

These aspects of the invention along with others will now be described with reference to the figures, wherein.

DETAILED DESCRIPTION

Figure 1:
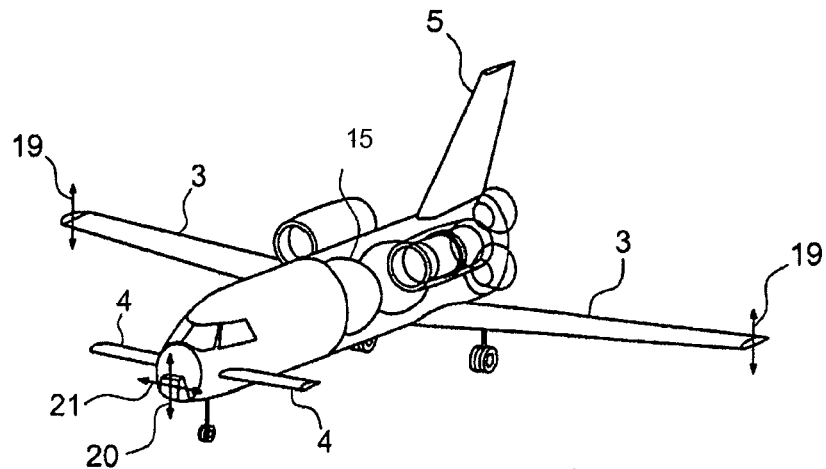
FIGS. 1 and 2 are an oblique view and a front view of the aircraft.
Figure 2:
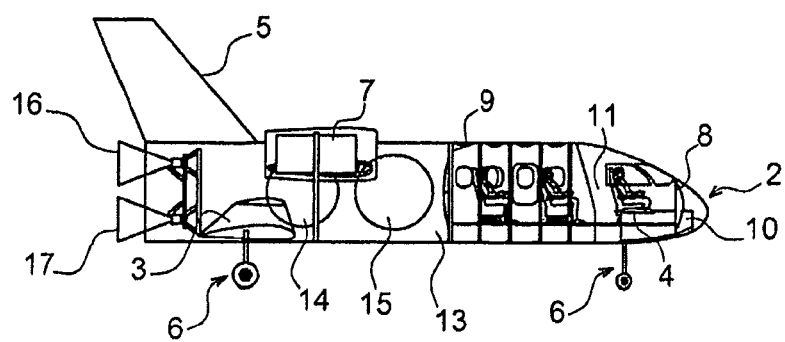
Figure 3:
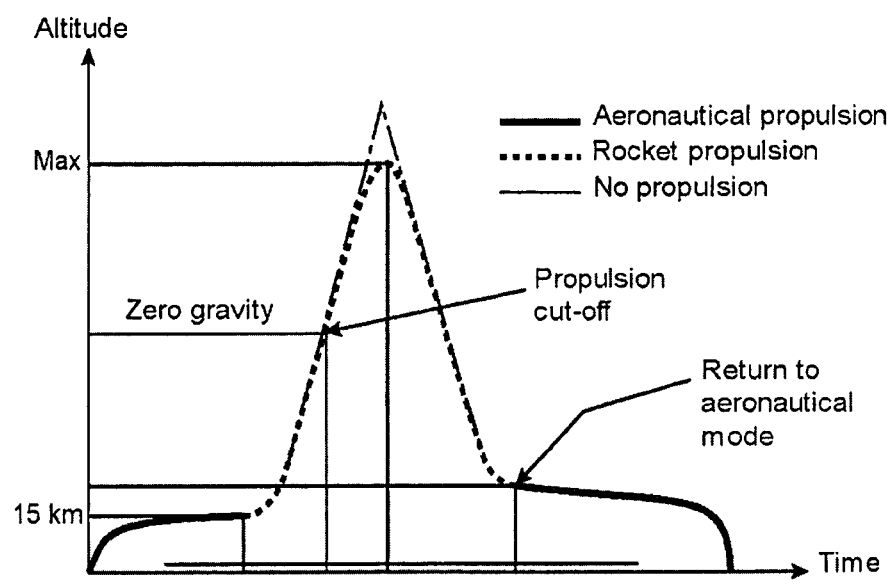
FIG. 3 illustrates a step of the flight.

The aircraft comprises a fuselage 1 having a general cylindrical shape but tapering to the front to a nose 2. From the fuselage 1 protrude a transverse wing 3 with a significant elongation in the lateral direction of the aircraft and a small back-sweep and which is located at the rear of the fuselage 1, at approximately 80% of the total length to the front, a transverse forward tail group 4 at the front, not far from the nose 2, and an upper fin 5 to the rear, with a large back-sweep, comparable to that of a conventional aircraft. The wing 3 is in this case positioned at a lower portion of fuselage 1, but it could be at mid-height or at a high height. It is also important to mention a landing gear 6 under the fuselage 1 and a pair of aeronautical engines 7 (turbojets), also located in the rear part of the fuselage 1 but somewhat to the front of the wing 3. The aeronautical engines 7 are, in this embodiment, mounted on the lateral sides of the fuselage 1 somewhat above same via fixing masts and platforms extending out from the fuselage 1. This design is not obligatory and the aeronautical engines 7 could be integrated in the structure of the fuselage 1, air intakes of same offering access to the combustion air and an outlet to the combustion gases.

The main interior arrangements of the aircraft are as follows. The volume of the fuselage 1 is divided into three main compartments by a front partition and a rear partition 9. A front compartment 10 housed by the nose 2 and at the front of the front partition 8 contains the control systems. A median compartment 11 is in this case the cabin containing the pilot and the passengers. The cabin is airtight, pressurised, equipped with doors and windows for access and observation, and equipped with equipment and fittings for transporting people. A rear compartment 13 at the rear of the rear partition 9 is assigned to propulsion. It comprises large propellant or fuel tanks 14 and 15 able to fuel two rocket propulsion units 16 and 17 positioned at the very rear of the aircraft and protruding outward. The use of a plurality of rocket propulsion units 16 and 17 (two or three in general) makes it possible to fire them in succession and offer a more progressive propulsion. A single propulsion unit may be used. In this case, it advantageously consists of variable thrust. The fuel required for the aeronautical engines 7 is contained in the wing 3. Finally, there is a smaller tank (not shown) than the propellant or fuel tanks 14 and 15 and wherein the function is to supply the aircraft orientation modification nozzles. Some of these nozzles bear the reference 19 and are positioned at the ends of the wing 3, oriented upwards and downwards to control aircraft rolling movements. Other nozzles 20 and 21 are positioned on the nose 2 of the aircraft and directed in vertical and horizontal direction in order to control pitching and yaw movements.

The aeronautical engines 7 and the rocket propulsion units 16 and 17, all arranged to exert a thrust to the front of the aircraft and therefore propel same, are the main engines thereof. The nozzles 20 and 21 are small auxiliary engines with no effect on the propulsion per se, as they only exert a rotation action by means of a displacement in the lateral direction.

The embodiment illustrated essentially herein was designed to transport four passengers and one pilot to an altitude of approximately 100 km, therefore a payload of 500 kg. The length of the aircraft is 10 to 15 m and the span thereof 15 to 25 m, the fuselage 1 having a height of approximately 2 m and capable of having circular or elliptical cross-sections. The wing 3 has a surface area of 35 $m^2$, the tail group 4 a span of 6 m and a surface area of 5 $m^2$, and the fin 5 a surface area of 10 $m^2$ and a height of approximately 4.5 m. The propellant or fuels may be liquid oxygen and liquid methane. The aircraft having a low mass and the mass of the propellant or fuels being low, it becomes simpler and more reliable. The mass at takeoff may be 10 to 15 tonnes including 5 to 7 tonnes of unladen mass, 3 to 5 tonnes of propellant or fuels, 0.5 to 2 tonnes of mass of kerosene, the remainder including the payload. The thrust of the aeronautical engines may be from 3000 to 7000 lbf (13.3 kN to 31.1 kN), the thrust of the rocket propulsion units from 150 to 400 kN, and the nozzles 19, 20 and 21 may each have approximately 400 N of thrust. In order to reduce the unladen mass, the structure of the aircraft will be advantageously made of composite materials as for the tanks, or made of aluminium-based light alloy such as aluminium-lithium.

How the aircraft completes the flights for which it was devised will now be described.

A first step relates to the takeoff and climbing flight to an altitude of up to 12, or 14 to 18 km approximately, preferentially above the general air traffic altitudes. Only the aeronautical engines 7 are used for this. No in-flight fuelling is performed, either with fuel for the aeronautical engines 7, or with propellant or fuel for the fixed engines 16 and 17: the aircraft carries all its fuel. The wing 3 is designed to favour the climbing flight to this altitude by offering the lift required to reach same, and being associated with a flight at subsonic speed, from Mach 0.5 to Mach 0.8, or possibly preferentially from Mach 0.5 to Mach 0.6, to thrust gently on the aircraft while making it climb as high as possible subject to high fuel consumption; the wing 3 is in any case poorly suited to supersonic speeds. After this first flight step, the rocket propulsion units 16 and 17 are fired, the aeronautical engines 7 switched off, and the lift of the wing 3 is used to rectify the trajectory to approximately 70° with respect to the horizontal. The forces on the aircraft structure are reduced as the firing of the rocket propulsion units 16 and 17 only starts at this high altitude due to the rarefied atmosphere, which makes it possible to retain a light structure and, in correlation, require a lower fuel mass. The mass of propellant or fuel required is in turn reduced due to the firing of the rocket propulsion units 16 and 17 at high altitude, owing to the subsonic flight. The rocket propulsion units 16 and 17 are started up successively in order to limit the forces in the first thrust phase. It is envisaged to mask the air inlet of the aeronautical engines 7 to prevent them from being subject to overheating and excessive gas velocities. The flight speed becomes supersonic, up to approximately Mach 3 or Mach 4. When the propellant or fuel has been used up, the rocket propulsion units 16 and 17 are switched off but the aircraft continues to climb by inertia up to an altitude of up to 80 to 120 km.

The third phase relates to the re-entry into the atmosphere, with all the propulsion unit engines being switched off. The angle of incidence of the aircraft is approximately 90°, i.e. it is oriented with its extension perpendicular to the trajectory in order to oppose the greatest drag resistance to maximise braking. Then, at an altitude of approximately 40 km, the angle of incidence is reduced to approximately 40°. This measure should make it possible to reduce the aerodynamic forces. The acceleration subjected to the passengers sought should not exceed approximately 5 g.

At the altitude of approximately 25 km, the speed of the aircraft returns to a subsonic level, the aircraft retrieves an aeronautical flight angle of incidence, the aeronautical engines 7 are fired or not, and the aircraft returns to Earth either by gliding or by means of motorised flight to a landing strip.

Some applications of the invention may be space tourism, the completion of microgravity experiments, the use of the aircraft as a first reusable stage of a satellite, or rapid passenger transfer.

The invention claimed is:

1. An aircraft comprising:
a fuselage,
a wing,
a plurality of aeronautical engines disposed on said fuselage, and
a plurality of rocket propulsion units,
wherein the wing is fixed, substantially straight and elongated in a lateral direction of the fuselage, and has a greater span than a length of the fuselage, and said plurality of rocket propulsion units comprises a plurality of propellant tanks positioned in a rear portion of the fuselage, the wing is positioned on said rear portion, and a front portion of the fuselage comprises a cabin, the aircraft being constructed to commence flight in a horizontal orientation, and
wherein said aircraft is a single stage aircraft.

2. The aircraft according to claim 1, wherein the wing span and the length of the fuselage are in a ratio between 1 and 2.

3. The aircraft according to claim 1, wherein the wing span and the length of the fuselage are in a ratio between 1 and 1.4.

4. The aircraft according to claim 1, wherein the aircraft has a surface loading of between 2.5 and 3.3 square meters per tonne.

5. The aircraft according to claim 1, wherein the aircraft has an unladen mass between 40% and 60% of a laden mass.

6. The aircraft according to claim 1, further comprising a tail group positioned on said front portion.

7. The aircraft according to claim 1, wherein said plurality of rocket propulsion units is a pair of said rocket propulsion units.

8. The aircraft according to claim 1, further comprising a landing gear.

9. The aircraft according to claim 1, further comprising a plurality of orientation modification nozzles including rolling control nozzles positioned on wing tips and pitching and yaw nozzles positioned at the front of the fuselage.

* * * * *